Jan. 25, 1938.  G. P. HENSLEY  2,106,407
CAN TESTING DEVICE
Filed Nov. 5, 1934
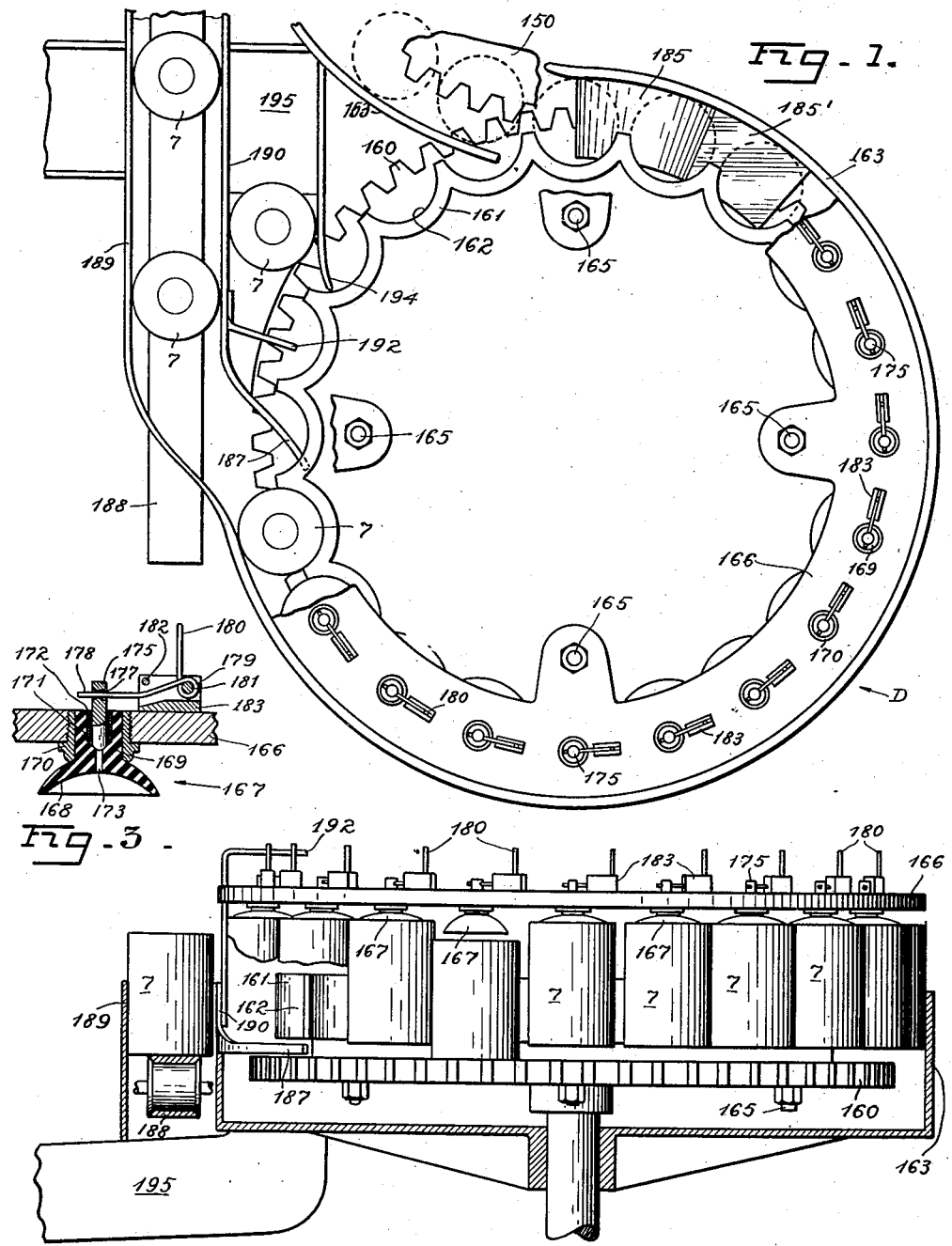
INVENTOR.
GUY P. HENSLEY
BY
ATTORNEYS.

Patented Jan. 25, 1938

2,106,407

UNITED STATES PATENT OFFICE 2,106,407

CAN TESTING DEVICE

Guy P. Hensley, Gustine, Calif.

Application November 5, 1934, Serial No. 751,632

3 Claims. (Cl. 73—51)

My invention relates to a can testing device, and particularly to those which are adapted to test cans with the top covers permanently secured to the body of the can and having a centrally disposed vent hole in the top cover, through which the cans are filled with fluid such as milk, oil, tomato juice, and the like.

An object of my invention is to provide automatic means for testing sealed cans and for segregating the unsealed cans from sealed cans.

Other objects and advantages will appear in the following specification, and the novel features of the device will be particularly pointed out in the appended claims.

My invention is illustrated in the accompanying drawing forming a part of this application, in which Figure 1 is a plan view of a can testing table;

Figure 2 is a side elevation of Figure 1, certain parts being shown in section; and Figure 3 is a cross section of the vacuum cup used in testing the cans.

A suitable combined feeding and driving means 150 for the can testing table D is shown in Figure 1. A guide rail 153 guides the cans 7, that are to be tested, onto the testing table. The testing table comprises a gear 160 meshing with the gear 150 and driven thereby, and a spacing ring 161 attached to the gear 160 and having pockets 162. The cans enter the pockets 162 and are retained therein by a guard rail 163.

Spaced from the gear 162 and affixed thereto by bolts 165 is a mounting ring 166 to the lower face of which a number of vacuum testing cups 167 is attached so that the center of each cup coincides with the center line of the corresponding can below.

The testing vacuum cup 167, see Figure 3, comprises an inverted cup-shaped member 168 having a cylindrical vertical portion 169 integral therewith. The portion 169 is pressed into a bushing 170 which is screwed into the mounting ring 166. In this way the cup 167 is attached to the ring.

The upper portion of the member 168 is provided with a central hole 171 into which a bushing 172 is inserted. The bore of the bushing communicates with a hole 173 of a small diameter arranged in the lower portion of the member 168 and communicates with the inside of the cup-shaped member 168. The bushing 172 slidably carries a plunger 175 which normally closes the hole 173. The plunger is loosely received in the bushing so that air can pass thereby. The plunger 175 has a transverse opening 177 through which an arm 178 of a lever 179 extends. The other arm 180 of the lever extends upwardly. The lever 179 is adapted to swing about a shaft 181 and the upward movement of the arm 178 is limited by a stop pin 182. The shaft 181 and the pin 182 are supported by a lever block 183 which is supported on the mounting ring 166.

From the foregoing description of various parts of the testing table D, the operation thereof will be readily understood.

Immediately after entering the testing table the cans encounter an upwardly inclined slide 185 (see Figure 1) with a flat portion 185'. The slide is placed in the path of the cans, whereby the cans are forced upwardly and against the vacuum cups 168. The latter spread outwardly as shown in Figure 2, and the air confined in the cup is forced out through the opening 173 and the bushing. The passing air exhausting from the cup momentarily lifts the plunger 175 upwardly, but the atmospheric pressure immediately thereafter forces the plunger downwardly, thereby closing the opening 173 and preventing the passage of air into the cup through the bore of the bushing. Therefore, when the cans leave the flat portion 185' of the slide 185 they continue to travel in suspended positions, being so held by the vacuum cups 168.

The cups 168 are of sufficient size to cover a considerable area of the can top, and if it happens that some vent in the cover has not been properly sealed, then air from the inside of the can begins to seep into the cup 168. This releases the vacuum and the cup drops the can, which thereafter continues to travel on the gear 160, until it strikes a finger 187, and is thereby directed onto a belt 188. This belt runs between the guards 189 and 190 and delivers the cans to an operator.

Well sealed cans remain in suspended position, and pass over the finger 187, but are dropped down thereafter by means of a release finger 192. This finger is attached to the guard 190 and extends over the ring 166 so that the upstanding arms 180 strike the release finger while corresponding testing cups 167 pass thereunder. The arm 180 being struck by the release finger 192 swings in a clockwise direction, and by means of the arm 178 raises the plunger 175. Air is thereby allowed to enter the cup 168. The can immediately drops onto the gear 160, and on its further forward movement strikes the deflecting rail 194 and is thereby guided into a discharging chute 195.

The checking of the filled and sealed cans dispenses with the old method of immersing each can in water and noting whether any bubbles escape from the sealed portion, and substitutes vacuum cups which support the cans. If a can leaks, the vacuum cup will release it and this can is separated from the others and is delivered back to the inspection table. The good cans are subsequently released from the vacuum cups and are delivered to the discharge chute.

While I have shown only the preferred form of my invention, it should be understood that various changes or modifications may be made within the scope of the appended claims without departing from the spirit of the invention.

I claim:

1. A checking device for filled and centrally sealed cans comprising a moving conveyor for carrying filled cans in an upright position, a plurality of vacuum cups positioned above the cans and movable along with the cans, means for moving the cans into engagement with the cups for causing the cups to contact with the can tops and to enclose the centrally sealed portion on the top, whereby the cups will continue to support the leak-proof cans above the conveyor and faulty cans will drop from their cups onto the conveyor, and means for freeing the leak-proof cans from their cups and for segregating them from the faulty cans.

2. In combination, a conveyor for filled cans, a vacuum cup disposed above each can and being movable with the conveyor, means for raising the cans so that the vacuum cups will contact with the can tops and will enclose the sealed part, said cups carrying the cans from the can raising means and supporting them clear of the conveyor, whereby leaky cans will permit air to enter their vacuum cups and allow these cans to drop onto the conveyor, means for removing the leaky cans from the conveyor, and means for admitting air to the vacuum cups of the good cans for freeing these cans from the cups.

3. In combination, a conveyor for filled cans, a vacuum cup disposed above each can, and being movable with the conveyor, means for raising the cans so that the vacuum cups will contact with the can tops and will inclose the sealed part, said cups carrying the cans from the can raising means and supporting them clear of the conveyor, whereby leaky cans will permit air to enter their vacuum cups and allow these cans to drop onto the conveyor, means for removing the leaky cans from the conveyor, the good cans being carried beyond said last named means, each vacuum cup having an air vent, means for normally closing said vent, and means for removing said last named means from the vent for admitting air to the vacuum cup of the good can, whereby the good cans are freed from the cups at a point removed from the faulty cans.

GUY P. HENSLEY.